Oct. 10, 1961 F. A. KANE, JR., ET AL 3,003,487
DEVICE FOR CONTROLLING THE ADMISSION OF FUEL
INTO INTERNAL COMBUSTION ENGINES
Filed Feb. 18, 1959 5 Sheets-Sheet 1

INVENTORS
FRANK A. KANE. Jr.
FRANK A. KANE
BY
*E.R. Posnack*
ATTORNEY

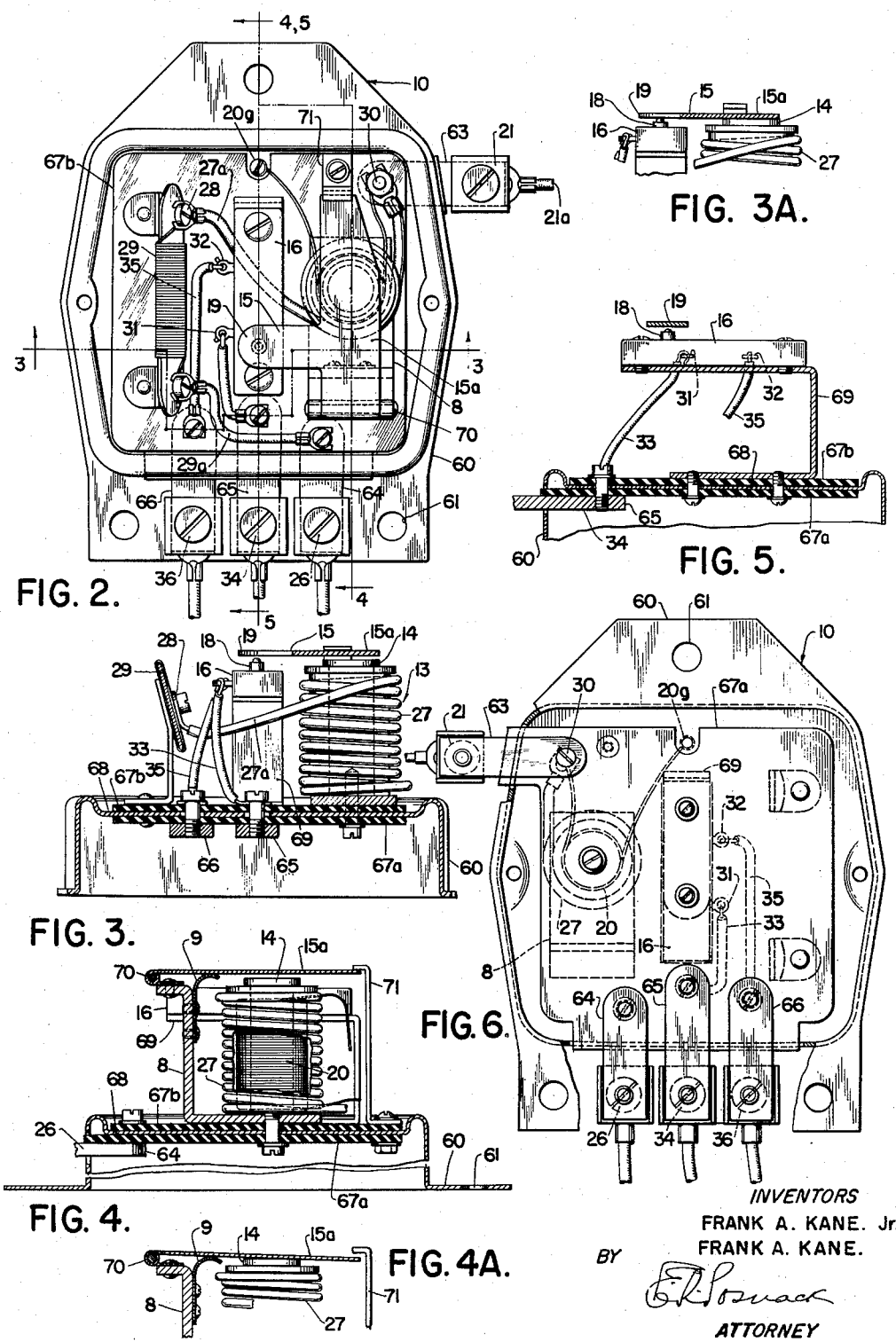

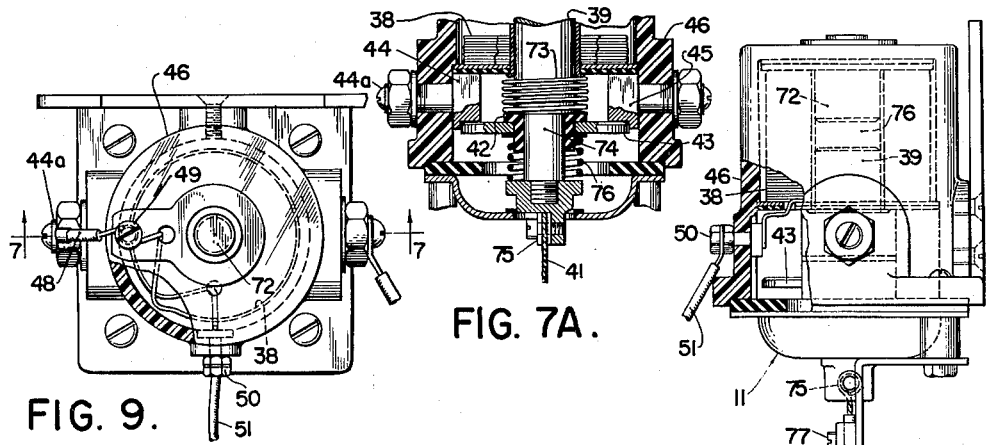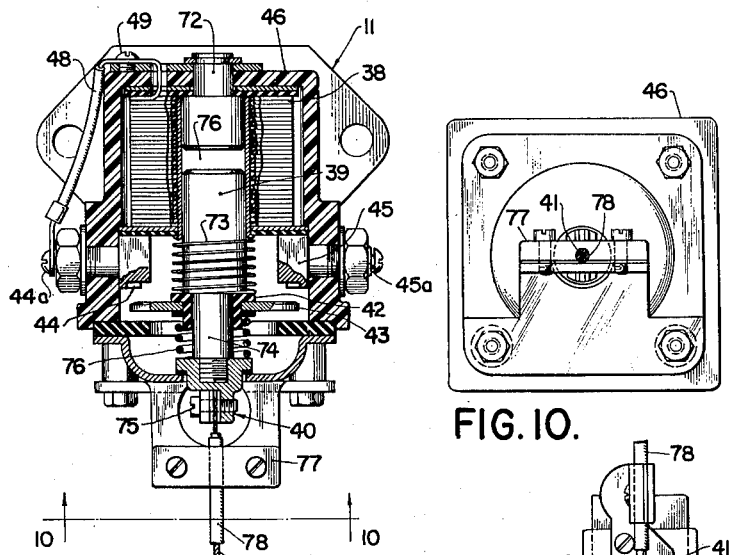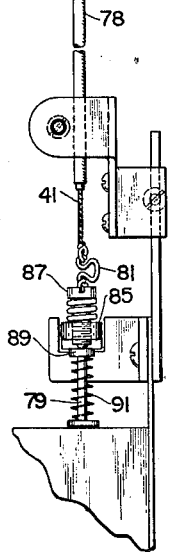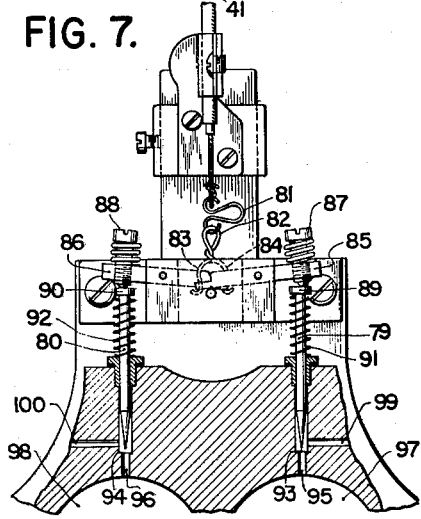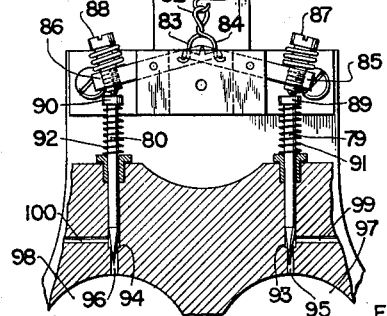

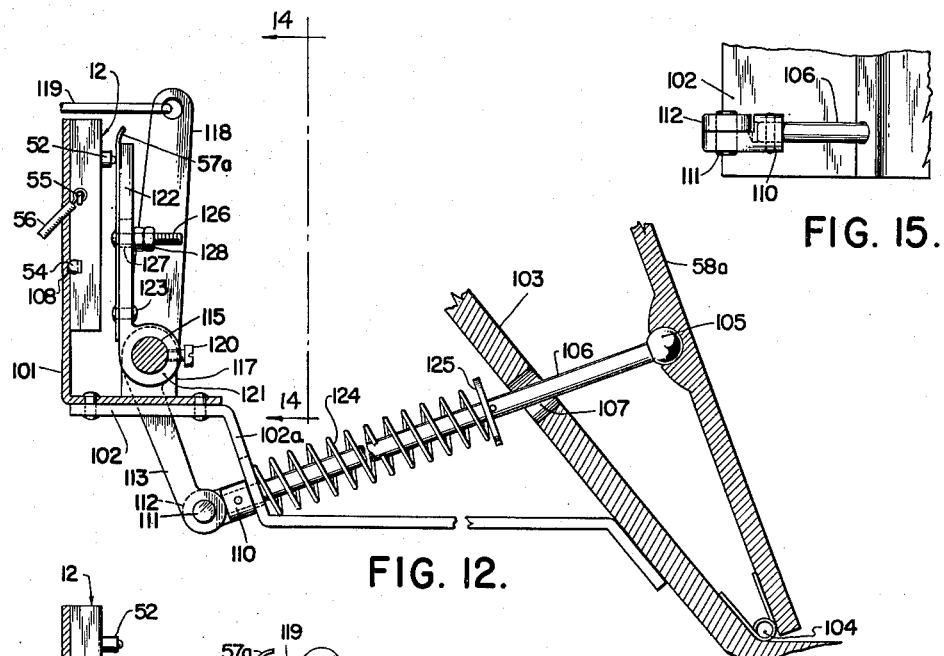
FIG. 15.
FIG. 12.
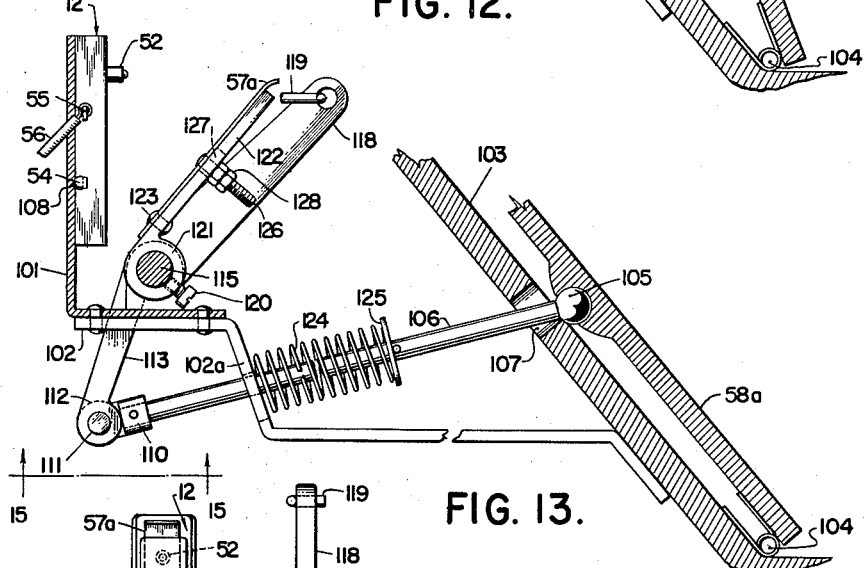
FIG. 13.
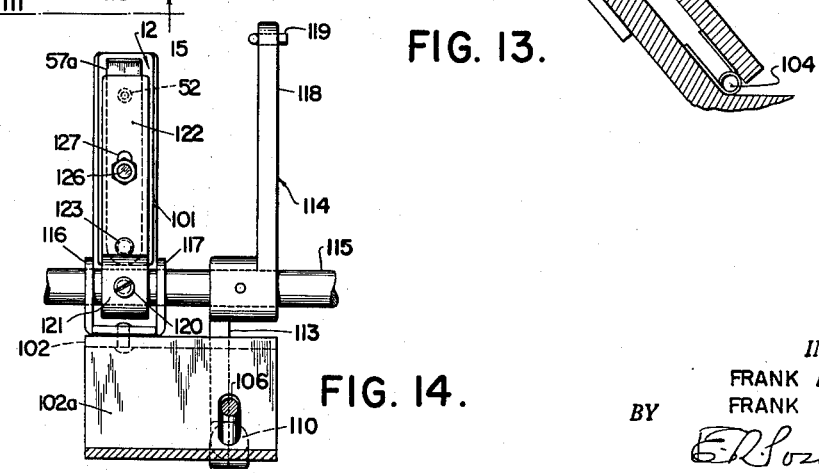
FIG. 14.
*INVENTORS*
FRANK A. KANE. Jr.
BY  FRANK A. KANE.
ATTORNEY INVENTORS
FRANK A. KANE. Jr.
FRANK A. KANE.

United States Patent Office 3,003,487
Patented Oct. 10, 1961

3,003,487
DEVICE FOR CONTROLLING THE ADMISSION OF FUEL INTO INTERNAL COMBUSTION ENGINES
Frank A. Kane, Jr., 18 Fairlea Ave., Stratford, Conn., and Frank A. Kane, 17 Fairview Terrace, Derby, Conn., assignors of one-quarter to Girard F. Oberrender and one-quarter to Emanuel R. Posnack, both of New York, N.Y.
Filed Feb. 18, 1959, Ser. No. 794,006
13 Claims. (Cl. 123—97)

This invention relates to the control of fuel admission into internal combustion engines, this being a continuation-in-part of our application filed July 11, 1955, Serial No. 521,225, now Patent No. 2,877,997.

The device of this invention, as in that of our said prior application, is particularly directed to the shutting off of fuel flow to the engine from the carburetor during deceleration, and the re-establishing of the flow after the deceleration cycle. In our prior invention, the control device for actuating the idler needle valves is operated by the pressure in the intake manifold. Since this pressure is affected by atmospheric conditions, it becomes necessary to make adjustments when such atmospheric conditions change. For example, when travelling at high altitudes, with rarer air densities than prevail at sea level, adjustments must be made so that the fuel cut-off would properly operate at such elevations. Similarly, changes in weather atmospheric conditions at one given level would also require suitable adjustments to be made.

It is the main objective of the present invention to provide a fuel admission valve control mechanism that is independent of atmospheric conditions, so that no adjustments need be made when travelling between different elevations, or when atmospheric conditions change at a given elevation. And in this aspect of our invention it is our objective to provide an electrical valve control device connected to the current supply means of the engine, whereby at a predetermined portion of the deceleration cycle the valve, which may be an idler needle valve or a plurality of such valves, will be brought into closing position to shut off the fuel supply, the valve or valves to be automatically opened at or near the end of deceleration to restore the fuel flow at idling speeds.

It is our further objective to accomplish the said fuel cut-off operation by instant and positive action, whereby fuel will be unfailingly discontinued during each deceleration cycle, thereby to prevent the drawing into the cylinders, during deceleration, of over-rich mixtures which are known to be discharged partly as unburnt fuel to cause atmospheric contamination and smog, as well as wastage of fuel. And in the accomplishment of this object it is also our objective to cause, by instant and positive action, the restoration of the fuel flow at the end of the deceleration cycle, so as to prevent the danger of stalling because of the said fuel cut-off action of our device.

Another object of our invention is to present an electrical control device having the functions aforesaid, and which can be operatively employed in conventional internal combustion engines without affecting or being adversely affected by the electrical system of the engine.

In the control device of the said parent application, a diaphragm-controlled switch member, operated by variations in the intake manifold pressure, is employed to actuate the circuit controlling the solenoid coactively associated with the needle valve. To eliminate an over-sensitive make-and-break action of the switch due to pressure variations within the intake manifold, and thereby eliminate undesirable flutter of the needle valve within the idling orifice, a bleeder tank is employed. The arrangement is such that when the vacuum in the intake manifold is increased to a predetermined value above normal idling vacuum upon deceleration, the circuit through the solenoid is immediately closed, causing an instantaneous closing of the idling orifice. But while the deceleration cycle is approaching its end and the pressure in the intake manifold is returning to its normal idling values, the bleeder tank serves to create a lag in opening the solenoid circuit through a separation of the switch contacts. Accordingly the needle valve is not opened immediately. It is only when there is an equalization of pressure within the switch control chamber and the intake manifold and the bleeder tank—at the predetermined normal pressure—that the contacts will separate and the solenoid circuit will be opened, thereby permitting the spring-loaded needle valve to return to its normal open position. In other words, the pressure within the intake manifold, after deceleration, is permitted to increase over a short range of values to permit the solenoid circuit to be broken. It is this action which eliminates the above-referred-to over-sensitive make-and-break, and which eliminates needle valve flutter. It is one of the important objectives of this invention to accomplish the said delayed action and elimination of needle valve flutter by our novel electrical control device, thereby obviating the need to employ a bleeder tank or any other device that must be operated by pressure conditions prevailing within the engine.

It is a further object of our invention, in a preferred form thereof, to provide means associated with the accelerator pedal for actuating the aforesaid electrical control device, whereby the deceleration fuel cut-off and restoration can be automatically accomplished by the normal operation of conventional driving controls.

Another object of this invention is the provision of a compact mounting for the components of our device, whereby it can be readily installed on conventional engines. And in this aspect of our invention it is also our objective to provide flexible connecting means between the needle valves and the actuating mechanism therefor, so as to render possible the positioning of the control and actuating components of our invention in regions other than in close juxtaposition to said valves.

And it is our objective to provide a relatively simple and easily fabricated device capable of performing the functions above mentioned.

Other objects, features and advantages will appear from the drawings and the description hereinafter given.

Referring to the drawings,

FIGURE 2 is a plan view of the casing containing the relay control device of our invention and associated parts.

FIGURE 3 is a section of FIG. 2 taken substantially along line 3—3, the armature arm being shown out of engagement with the coactive contact of the relay switch.

FIGURE 3A is a fragmentary view like FIG. 3, but showing the armature arm in engagement with the relay switch contact.

FIGURE 4 is a section of FIG. 2 taken along line 4—4, the armature being shown out of engagement with the relay core and in engagement with the stop member.

FIGURE 4A is a fragmentary view like FIG. 4, but showing the armature in engagement with said core and out of engagement with said stop member.

FIGURE 5 is a fragmentary section of FIG. 2 taken along line 5—5.

FIGURE 6 is a bottom view of the casing of FIG. 2.

FIGURE 7 is a longitudinal section of the solenoid device of our invention shown in inoperative position, the section being taken along line 7—7 of FIG. 9, fragments being removed for clarity, said device being shown operatively connected to the needle valves of a dual carburetor shown in section, said needle valves being shown in their normally retracted and open positions.

FIGURE 7A is a fragmentary section of the solenoid device of FIG. 7, but shown in operative position.

FIGURE 8 is a fragmentary side view of FIG. 7, a portion being broken away and sectioned for clarity.

FIGURE 9 is a top view of FIG. 7, a portion being broken away for clarity.

FIGURE 10 is a section of FIG. 7 taken along line 10—10.

FIGURE 11 is a fragmentary section like the lower part of FIG. 7, but showing the needle valves in their operatively closed positions.

FIGURE 12 is a vertical section through the accelerator pedal, floor board and pedal switch bracket of our invention, the pedal being shown in its fully released or extreme low-speed position and the switch contact being shown operatively engaged.

FIGURE 13 is a view like FIG. 12, but showing the accelerator pedal in its high-speed position and the pedal switch unengaged.

FIGURE 14 is a section of FIG. 12 taken along line 14—14.

FIGURE 15 is a fragmentary bottom view of FIG. 13 looking in the direction of arrows 15—15.

Figure 1:
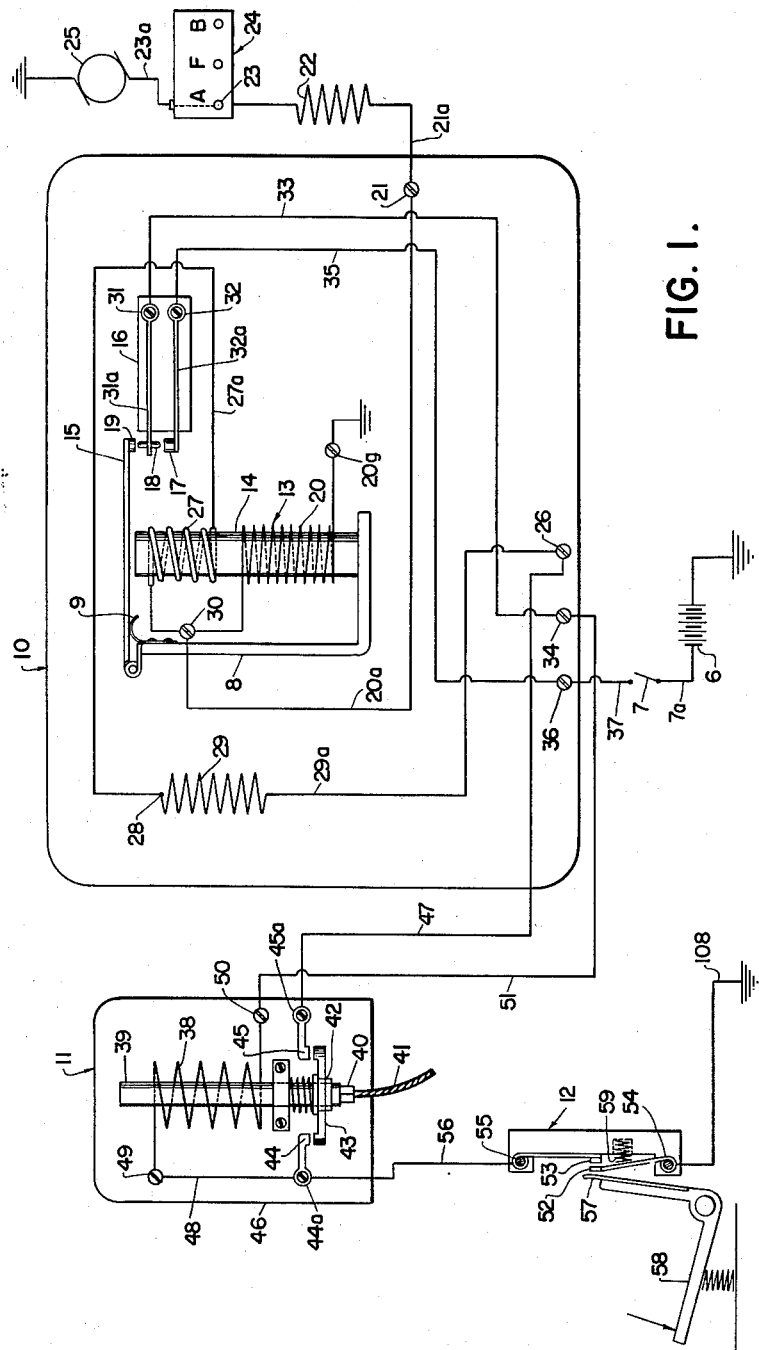
FIGURE 1 is a schematic diagram of an embodiment of our invention, showing the electro-mechanical arrangement of the relay control device, solenoid and pedal switch components in operative relation to the generator and voltage regulator of an automobile engine, the coactive contacts of the electrical system of said components being shown separated.

The specific circuit and operating connections of the system of our invention are set forth on FIGURE 1. The novel relay control means of this invention are contained within a casing generally designated 10 (see FIG. 2), such means being operatively connected to the needle valve solenoid actuator 11 and the pedal switch 12 adapted to be actuated by the accelerator pedal when the latter is in a predetermined position, all in a manner to be hereinafter described.

Casing 10 contains the relay device 13 comprising the core 14, the spring-loaded switch-actuating armature arm 15 and the relay switch 16, the latter having the two normally separated contacts 17 and 18—contact 18 being positioned in coactive relation with the terminal 19 of said arm 15, so that when the arm 15 is operatively drawn down upon the magnetization of core 14, terminal 19 will engage contact 18 and cause it in turn to engage contact 17. In the form of our invention illustrated in FIG. 1, said arm 15 is engaged by spring element 9 mounted on the bracket 8, the arm 15 being normally urged away from contact 18, so that contacts 18 and 19 are normally separated.

Surrounding core 14 is the fine wire coil 20 one end of which is connected to terminal 30 on said bracket 8 and electrically connected by conductor 20a to terminal 21 which in turn is electrically connected by conductor 21a to the resistance 22, the latter being connected to the armature terminal 23 of the conventional voltage regulator 24, said terminal 23 being electrically connected through conductor 23a to the armature of the generator 25. The opposite end of coil 20 is connected to the grounded terminal 20g on the casing 10.

Disposed over core 14 is another coil of relatively heavy wire 27 and of fewer turns than coil 20, the differential electrical characteristics of said coils being predetermined for purposes to be hereinafter set forth. One end of coil 27 is connected to said terminal 30 and then by said conductor 20a to said terminal 21 in series with the generator 25, the other end of coil 27 being connected by conductor 27a to the fixed resistance 29 mounted within casing 10, said resistance being electrically connected by conductor 29a to the terminal 26. It is important to note that in the particular embodiment illustrated coils 20 and 27 are wound about core 14 in opposite directions.

The said relay switch 16 has thereon two terminals, one being terminal 31 electrically connected by conductor 31a to said contact 18, and the other being terminal 32 electrically connected by conductor 32a to said contact 17 of the switch. Connected to the terminal 31 is the conductor 33 which leads to the battery circuit terminal 34 on casing 10; and connected to said terminal 32 is the conductor 35 which leads to terminal 36 on the casing 10 connected to which is the conductor 37 leading to the ignition switch 7 which is connected by conductor 7a to the battery 6 one terminal of which is grounded.

The solenoid device 11 contains the solenoid coil 38 within which is operatively disposed the spring-loaded plunger 39 the terminal 40 of which is connected by the Bowden wire 41 to the spring-loaded idler needle valves to be hereinafter described. Fixedly mounted upon the plunger 39 and separated therefrom by the insulator 42 is the conductor disk 43 proportioned and positioned for operative engagement, when the plunger 39 is in its upper operatively retracted position, with the contacts 44 and 45 of the respective terminals 44a and 45a on the solenoid casing 46 of insulating material. Said terminal 45a is connected through said conductor 47 to terminal 26 of relay device 13; and said terminal 44a is connected through conductor 48 to terminal 49 to which one end of the solenoid coil 38 is connected, the other end of the said coil being connected to terminal 50 on the casing 46. Electrically connecting said terminal 50 and terminal 34 of the relay device 13 is the conductor 51.

The said accelerator pedal switch 12 contains the two contacts 52 and 53 normally held closed by the arm 57 of the accelerator pedal 58, the spring 59 normally keeping said contacts separated—contact 52 being operatively engageable by said arm, to be more fully hereinafter described. The arrangement is such that when the accelerator pedal is in its normal undepressed or low-speed position, the contacts 52 and 53 are in engagement; but when the pedal is depressed away from said low-speed position, the contacts 52 and 53 are separated. Contact 52 is connected to grounded terminal 54 of the casing switch 12; and terminal 53 is electrically connected to terminal 55 of said switch casing, said terminal 55 being connected, through conductor 56, to said terminal 44a of solenoid casing 46.

The components of the above-described relay device, solenoid and pedal switch are compactly arranged for ready mounting on a motor vehicle. As can be seen from FIGS. 2 to 6, the casing 10 contains thereon all the components of the relay device, said casing having a base 60 with apertured portions 61 for receiving therethrough suitable fasteners whereby the relay device can readily be attached to the dashboard, engine block or any other convenient part of the vehicle. The terminals 21, 26, 34, 36 are mechanically and electrically connected to the respective conductor bars 63, 64, 65 and 66, these bars being attached to the underside of the insulating plate 67a underlying the floor 68 of the casing 10, the insulating plate 67b overlying said floor. It is thus evident that said terminals 21, 26, 34 and 36 are insulated from the casing proper. Coil 20, however, is connected directly to the casing at the terminal 20g, whereby the coil 20 is grounded at this point.

The relay switch 16 is mounted on the bracket 69 extending upwardly from the insulating plate 67b on floor 68, the contact member 18 of the switch extending upwardly therefrom and positioned for underlying engagement with arm 15 of the armature 15a. The said armature 15a is pivotally mounted at the hinge 70 attached to the bracket 8, said armature extending over the core 14 and being limited in its upward movement by the overlying lip of the stop member 71 (see FIG. 4). The construction of switch 16 is diagrammatically illustrated in FIG. 1, no further details being shown since it is well known to those skilled in the art. The armature arm 15 is urged upwardly away from contact 18 by the spring 9 mounted on the bracket 8, said core 14 being adapted, as aforesaid, to magnetically attract said armature and bring arm 15 into operative engagement with contact 18.

Because relay device 13 operates electrically through the conductors 21a, 37, 47 and 51, the coacting devices are subject to flexible arrangement. Hence the solenoid device 11 may be mounted remotely therefrom— and may even be mounted on the dashboard, since its operative connection to the needle valves is through a flexible Bowden wire, in a manner to be hereinbelow explained.

As illustrated in FIGURES 7 to 10, the solenoid device includes the casing 46 of insulating material, the coil 38 electrically connected to the casing terminals 44a and 50, the conventional stationary core 72, and spaced therebelow to provide the clearance 76 is the said movable core 39 urged downwardly by spring 73 in conventional manner. Mounted over reduced portion 74 of the plunger is the insulator bushing 42 supporting the conductor disk 43 adapted to engage the respective contacts 44 and 45. The spring 76 urges the disk 43 upwardly in conventional manner, so that when the plunger is operatively actuated upwardly upon the energization of the solenoid, the disk will be yieldably maintained against said contacts. Attached to the bottom of the reduced plunger portion 74 is the clamp 75 holding the Bowden wire 41 slidably extending through the flexible wire casing 78 supported by clamp 77. Said Bowden wire is connected, through a mechanism substantially like that described in our said parent application, to the idler needle valves 79 and 80 (see FIGS. 7 to 11). In our construction illustrated, the Bowden wire is connected to the spring member 81 attached to the connector member 82 the legs 83 and 84 of which are connected to the inner terminals of the pivotally mounted levers 85 and 86. Extending through and in threaded engagement with the outer ends of said levers are the spring-loaded adjusting screws 87 and 88 the terminals of which are in engagement with the heads of the respective valve stems 89 and 90 of said needle valves 79 and 80, the latter being urged by springs 91 and 92 into their open positions out of engagement with the seats 93 and 94 of the respective fuel inlet orifices 95 and 96 leading to the carburetor fuel mixture intake passageways 97 and 98.

When the solenoid plunger 39 is in its inoperative position illustrated in FIG. 7, the valves 79 and 80 are in their normal open positions, whereby fuel is permitted to enter from fuel supply channels 99 and 100 into said passageways 97 and 98. But when the solenoid is operatively actuated, the plunger 39 is drawn up, whereby the attached Bowden wire 41 exerts a pull on the spring 81 and connector 82 which in turn actuate the levers 85 and 86 to force the screws 87 and 88 against the valve stems 89 and 90, thereby closing the idler orifices 95 and 96 and shutting off the fuel supply.

The above-mentioned pedal switch 12 is mounted on the bracket 101 attached to support 102 which, in the embodiment illustrated, is affixed to the floor board 103. Pivotally attached to the latter at hinge 104 is the accelerator pedal 58a to which is pivotally secured, through the ball joint 105, the actuating rod 106 which extends through the aperture 107 in said floor board, said rod having its forward end attached to the bracket 110 mounted over the pin 111. Rotatably mounted over said pin is the lower terminal 112 of the arm 113 of the bellcrank 114 which is fixedly mounted on shaft 115, the latter being rotatably supported by the two upstanding ears 116 and 117 of said bracket 101. The arm 118 of said bellcrank 114 is connected by link 119 to the carburetor throttle in well-known manner. Secured by set screw 120 to said shaft 115, between said ears, is the collar 121 integral with the bar 122 to which the contact arm 57a is attached by rivet 123 near the base of said bar. In the particular construction illustrated, said arm 57a is made of spring material, so that its position relative to said bar 122 can be adjusted, in a manner to be hereinafter set forth. Suffice it to say, for the moment, that said arm 57a is positioned for operative engagement with the contact 52 of switch 12 when the pedal 58a is in its low-speed or idling position. The spring 124, mounted over rod 106 and disposed between and in engagement with section 102a of the support 102 and the stop disc 125 affixed to rod 106, is effective to urge the pedal 58a to its retracted or low-speed position illustrated in FIG. 12. The arrangement is such that in this low-speed or idling position the contact arm 57a forces the contact 52 into engagement with its coacting contact 53, these contacts being separated by spring 59 (see FIG. 1) when said contact arm is retracted from contact 52 upon an operative depression of the accelerator pedal. Connected to the terminal 55 of pedal switch 12 is the conductor 56 which leads to the terminal 44a of the solenoid device 11 (FIG. 1), said pedal switch having its terminal 54 grounded to bracket 101 at 108.

In the operation of our invention, upon depressing the accelerator pedal, the resultant increase in generator speed will cause an engagement of the relay contacts 17 and 18, but the solenoid will not be energized until said contacts 52 and 53 are brought into contact; and this will only occur when the pedal is released to its low-speed or idling position, such as that shown in FIG. 12. Upon the operative energization of the solenoid through the said release of the pedal, the needle valves 79 and 80 are operatively closed, in the manner aforesaid, and they remain closed until the diminishing motor speed is reduced to a predetermined critical speed—preferably just above idling speed—at which point the valves suddenly open to restore the fuel flow. The electro-mechanical operation of our device for accomplishing this result is described below:

As is evident from the above description, coil 38 of the solenoid 11 is in the battery circuit, and in series with the contacts 17 and 18 of the relay switch 16 and the contacts 52 and 53 of the accelerator pedal switch 12. It is only when this battery circuit is closed—that is, when the respective contacts 52, 53 and 17, 18 are in engagement—that the solenoid 11 will be actuated to close the idler needle valves. This condition can occur only when two other conditions are satisfied, (1) when the accelerator pedal is in its inoperative or full deceleration position with the contact arm 57 (57a in FIG. 12) holding contacts 52 and 53 together, and (2) when the relay arm 15 is being held in its operative position by the adequately magnetized core 14, the terminal 19 of said arm 15 holding said contacts 17 and 18 together. The idler needle valves will continue to be held closed, shutting off fuel supply to the engine, as long as the current in coil 20 is of such magnitude as to maintain the core 14 sufficiently magnetized so that it could continue to hold down arm 15. It is only when the magnetization of the core 14 is reduced to a point where its holding power can no longer attract armature 15a and arm 15 that the contacts 17 and 18 will be separated to effect a release of solenoid plunger 39 and a consequent opening of the idler needle valves.

It is of extreme importance to note that, in the preferred embodiment of our invention illustrated, the magnetization of the core 14 is not suddenly reduced to its said non-holding position immediately upon the deceleration release of the accelerator pedal and the closing of the contacts 52 and 53. The electro-mechanical arrangement is such as to keep the relay arm 15 down in its operative position until the end of the deceleration cycle, that is, until the motor speed and consequently the r.p.m. of the generator 25 are reduced to a predetermined point where the magnetization of core 14—induced by the generator current—will fall to a value where it can no longer hold said arm 15. The lag between the relatively high speed of the motor and generator at the instant of the release of the pedal and this predetermined reduced speed is obviously due to the inertia of the revolving rotors. It is this interval of time during the deceleration cycle, between the closing of the contacts 52 and 53 of the accelerator pedal switch and the separation of the contacts 17 and 19 of the relay switch, that prevents an oversensitive response of the solenoid to the movements of pedal 58, the lag of the separating action of the relay contacts 17 and 18 preventing an undesirable fluttering action of the idler needle valves upon deceleration.

In order to understand the operative releasing action of the relay arm 15 with the consequent separation of the contacts 17 and 18 during deceleration, it should be noted that, as aforesaid, the generator 25 is connected in series with the coil 20, so that the greater the speed of the generator the greater the magnetization of core 14, and vice versa. The generator is also connected in series with the coil 27 (of relatively few turns), resistance 29, conductors 29a and 47, the solenoid switch consisting of the contacts 44 and 45 and the bridging disk 43, the conductor 56 and the pedal switch consisting of contacts 52 and 53. Hence, in order for current from generator 25 to pass through coil 27, both the said solenoid and pedal switches must be closed. As aforesaid, this occurs (during deceleration) when contacts 52 and 53 are brought together upon a full release of the accelerator pedal (the contacts 17 and 18 still being engaged). The current through coil 27 flows counter to that of coil 20, thereby opposing the magnetization of core 14 by coil 20; but since the turns of relatively heavy coil 27 are fewer than those of the coil 20, the counter current of coil 27—the magnitude of which is determined, to an extent, by the resistance 29—will not entirely neutralize the core, but will serve merely to reduce its magnetic grip upon arm 15a. Only when the generator's speed is reduced to a sufficiently low value will the induced magnetization of core 14 by coil 20—already reduced by the counter-effect of coil 27—be reduced to a level where it can no longer hold arm 15a. The resistances 22 and 29 are of such predetermined values, and coils 27 and 20 are of such predetermined electrical characteristics, that the desired critical level of demagnetization of core 14 occurs when the speed of the motor engine—which operates the generator 25—is reduced to the said predetermined critical point slightly above idling r.p.m. It is only when the engine slows down to below this critical speed that the arm 15 is released, the contacts 17 and 18 separated, and the circuit through the solenoid coil 38 broken, whereby the plunger 39 is released to its inoperative position at which it holds the idler needle valves open.

Because of the aforesaid weakened magnetic condition of core 14 resulting from the counter-effect of coil 27, the operative separation of contacts 17 and 18 occurs quickly and with positive action, whereby the opening action of the needle valves is as positive as their above-described closing action. With the opening of the idler needle valves at the instant the motor's speed is reduced to predetermined idling r.p.m.—or preferably slightly thereabove—the fuel flow to the engine is restored, without the danger of stalling. This closes the deceleration portion of the acceleration-deceleration cycle.

The new cycle starts with depressing the pedal to accelerate, whereby the pedal switch contacts 52 and 53 are separated, the speed of the motor and generator increasing until it exceeds said critical point. It now creates enough current in coil 20 to cause its core to attract arm 15a and close the relay contacts 17 and 18. However, the closing of the latter contacts will have no effect on the solenoid coil 38 in series with the separated pedal switch contacts 52 and 53, so that the solenoid 11 remains inoperative and the idler needle valves remain in open position, until operatively closed in the manner above explained.

Figure 16:
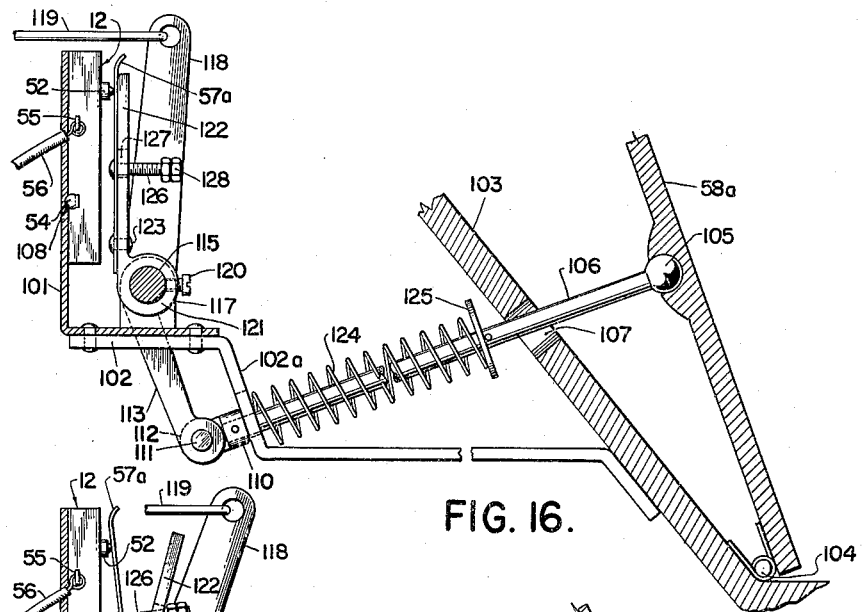
FIGURE 16 is a view substantially like FIG. 12, but showing the contact arm adjusted so that it will engage the switch contact when the accelerator pedal is not in its fully released position.
Figure 17:
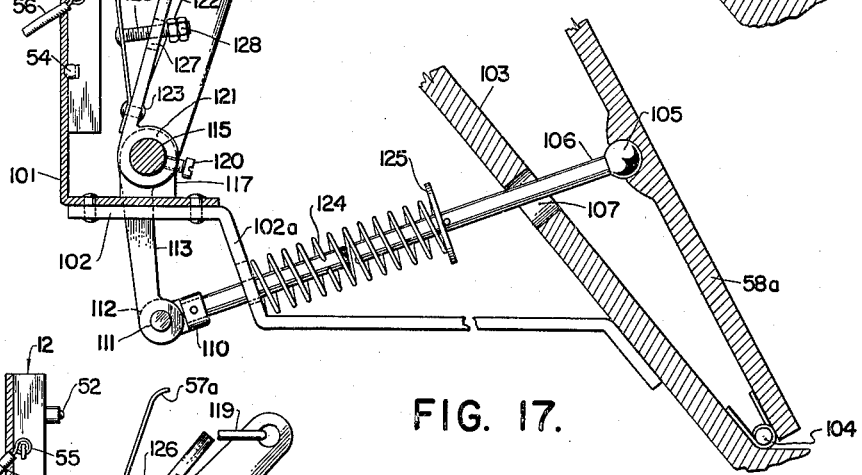
FIGURE 17 is a view like FIG. 16, but showing the accelerator pedal in a position intermediate its high and low speed positions, with the contact arm in operative engagement with the switch contact.
Figure 18:
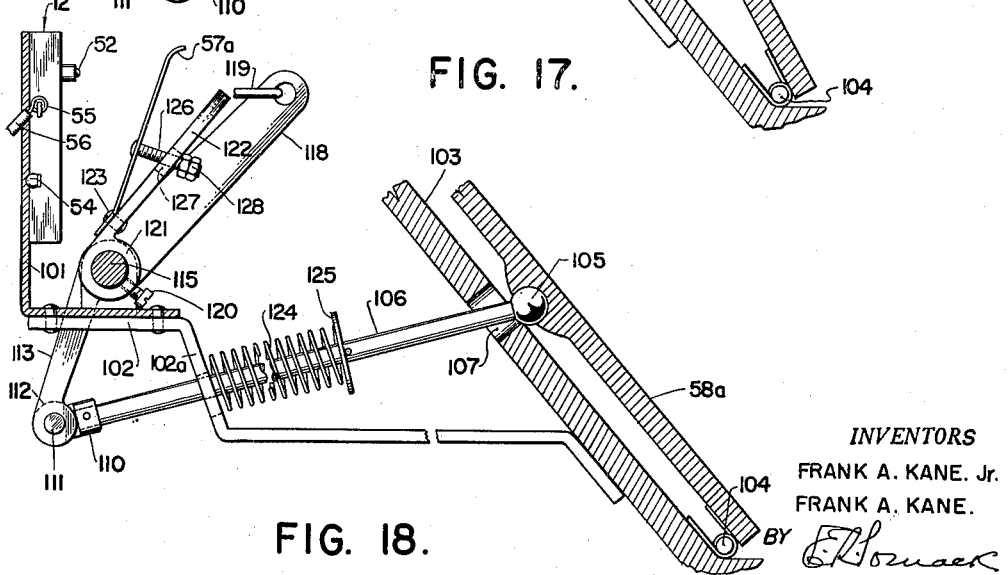
FIGURE 18 is a view like FIG. 17, but showing the accelerator pedal in a high speed position and the contact arm out of engagement with the switch contact.

Although in the embodiment above described, the pedal contact arm 57 (or 57a) engages the switch contact element 52 at the extreme low-speed position of the accelerator pedal, it is within our contemplation to effect such an operative engagement at any other predetermined position of the accelerator pedal, if need be. In the particular construction illustrated in FIGS. 12 to 18, the spring contact arm 57a has affixed thereto the screw 126 extending through the aperture 127 of the bar 122, the adjusting nuts 128 being in threaded engagement with the shank of said screw. By retracting said adjusting nuts to a predetermined rear position on the screw 126, as shown in FIGS. 16 to 18, the arm 57a can be brought into engagement with the contact 52 before the pedal has been fully released. FIG. 16 shows arm 57a held in pressing engagement with contact 52 when the pedal 58a is in its fully released position, the spring 124 being strong enough to hold the bar 122 in its foremost position, against the yieldable resisting action of said spring arm 57a. When the pedal is in the intermediate depressed position shown in FIG. 17, the arm 57a is still in engagement with contact 52, the upper part of said arm being normally bent forwardly away from the bar 122, as illustrated. But since in this position the adjusting nuts 128 are in engagement with the bar 122, any further clockwise movement of said bar will be transmitted through the screw 126 to the arm 57a, to separate the latter arm from contact 52. FIG. 18 clearly shows the arm 57a completely out of engagement with the contact 52 when the pedal 58a is in a high speed position.

Wherever contact is operatively made during deceleration, whether at idling speeds or thereabove, the device is effective in causing an instant closing of the fuel inlet valves to shut off the fuel supply into the engine. The valves will remain closed as the speed of the engine is being diminished to the required critical value. When this point is reached, and only then, will the relay switch 16 be opened, to permit the opening of the fuel inlet valves. This opening action occurs in a quick and positive manner—without any lag once the critical speed is reached—thereby instantly restoring the flow of fuel, without the danger of stalling.

The entire action is electrical, and not dependent upon manifold pressures, as is the case in the device of the parent application. Hence, changes in atmospheric pressures due to differences in altitude will not affect the operation of this device. Moreover, the positioning of a resistance 22 of adequate magnitude between the engine's generator 25 and the relay unit 13 is effective in preventing any undesirable fluctuations in the conventional electrical system of the engine as a result of the operation of this invention, or vice versa.

It should be noted that whereas the resistance 29 can be predetermined and hence fixed for the components of our invention comprising the relay device 13, solenoid 11 and pedal switch 12, the value of the resistance 22 is dependent upon the electrical system of the particular installation to which our invention is applied. Once the optimum resistance for the installation—whether a motor vehicle or other engine—is determined, resistance 22 becomes the fixed resistance for the entire system. It is for this reason that resistance 22 is shown fixed, although it is evident that for the commercial embodiment of our invention a variable type of resistor should preferably be supplied, so that the optimum fixed resistance could be readily determined experimentally.

In the above description, the invention has been disclosed merely by way of example and in preferred manner; but obviously many variations and modifications may be made therein. It is to be understood, therefore, that the invention is not limited to any specific form or manner of practicing same, except insofar as such limitations are specified in the appended claims.

We claim:

1. In a fuel control device for an internal combustion engine having a fuel passageway operatively connected therewith, the combination of a valve member operatively connected with said passageway, electro-mechanical valve-actuating means operatively connected to said valve member, a source of electrical energy, a first electrical circuit connecting said source and said electro-mechanical means, a switch in said circuit, electro-mechanical switch-actuating means operatively connected to said switch and operatively responsive to electrical energy above one predetermined critical magnitude for opening said switch and below another critical magnitude for closing said switch, an electrical generator connected to said engine, whereby the speed of the engine will control the operative speed of the generator, and a second electrical circuit connecting said generator and said electro-mechanical switch-actuating means, said latter means being responsive to the current from said generator for actuating said switch, whereby said electro-mechanical valve-actuating means will be energized by the current in said first electrical circuit to actuate said valve member, said generator being operable at a range of speeds for producing electrical energy of magnitudes ranging from below the lesser of said critical magnitudes to above the greater of said critical magnitudes.

2. In a fuel control device for an automobile internal combustion engine having a fuel passageway operatively connected therewith and an accelerator pedal, the combination of a valve member operatively connected with said passageway, electro-mechanical valve-actuating means operatively connected to said valve member, a source of electrical energy, a first electrical circuit connecting said source and said electro-mechanical means, a normally open first switch in said circuit, electro-mechanical switch-actuating means operatively connected to said switch and operatively responsive to electrical energy above one predetermined critical magnitude for opening said switch and below another critical magnitude for closing said switch, an electrical generator connected to said engine, whereby the speed of the engine will control the operative speed of the generator, a second electrical circuit connecting said generator and said electro-mechanical switch-actuating means, said latter means being responsive to the current from said generator for closing said switch, a normally open second switch in said first circuit, yieldable means connected to said accelerator pedal for operatively closing said second switch when said pedal is in a predetermined low-speed position, said generator being operable at a range of speeds for producing electrical energy of magnitudes ranging from below the lesser of said critical magnitudes to above the greater of said critical magnitudes.

3. In a fuel control device for an internal combustion engine having a fuel passageway operatively connected therewith, the combination of a valve member operatively connected with said passageway, electro-mechanical valve-actuating means operatively connected to said valve member, a source of electrical energy, a first electrical circuit connecting said source and said electro-mechanical means, a switch in said circuit comprising two coactive contacts, a spring loaded arm movable from a normally inoperative to an operative position at which it is operatively engageable with one of said contacts for actuating said switch, electro-mechanical switch-actuating means comprising a core and two opposing conducting coils operatively disposed thereabout, the first being a magnetizing coil and the second a demagnetizing coil, said core being disposed in adjacent relation to said arm for attracting and moving it to its said operative position when the core is operatively magnetized, an electrical generator connected to said engine, whereby the speed of the engine will control the operative speed of the generator, a second electrical circuit connecting said generator to said first coil, and a third electrical circuit connecting said generator to said second coil, the electrical characteristics of said respective coils and their said respective electrical circuits being such that the operative core-magnetizing action of said first coil is greater than the operative demagnetizing action of said second coil, whereby when said core is operatively magnetized for attracting said arm said electro-mechanical valve-actuating means will be energized by the current in said first electrical circuit to actuate said valve member.

4. In a fuel control device for an internal combustion engine having a fuel passageway operatively connected therewith, the combination according to claim 3, and a switch in said third electrical circuit operatively actuated by said electro-mechanical valve-actuating means.

5. In a fuel control device for an internal combustion engine having a fuel passageway operatively connected therewith, the combination according to claim 3, said first coil and said second electrical circuit having such electrical characteristics as to induce sufficient magnetic energy in said core for operatively attracting said arm only in response to electrical energy above a predetermined critical magnitude, said generator being operable at a range of speeds for producing electrical energy of magnitudes ranging from below to above said critical magnitude.

6. In a fuel control device for an internal combustion engine having a fuel passageway operatively connected therewith, the combination according to claim 3, said valve-actuating means comprising a solenoid having a plunger and a conducting coil operatively disposed thereabout, said plunger being operatively connected to said valve member and being operatively movable between an operative and an inoperative position, a contact member mounted on and movable with said plunger, and solenoid contacts with which said contact member is in engagement when the plunger is in one of its said positions, said last-mentioned contacts being in said third electrical circuit.

7. In a fuel control device for an internal combustion engine having a fuel passageway operatively connected therewith, the combination according to claim 3, a switch in said third electrical circuit operatively actuated by said electro-mechanical valve-actuating means, and a pedal switch in said first electrical circuit, whereby said switch in said third circuit will be actuated only upon a closing of said pedal switch.

8. In a fuel control device for an automobile internal combustion engine having a fuel passageway operatively connected therewith and an accelerator pedal, the combination according to claim 3, said valve-actuating means comprising a solenoid having a plunger and a conducting coil operatively disposed thereabout, said plunger being operatively connected to said valve member and being operatively movable between an operative and an inoperative position, a contact member mounted on and movable with said plunger, and solenoid contacts with which said contact member is in engagement when the plunger is in one of its said positions, said last-mentioned contacts being in said third electrical circuit, yieldable means urging said accelerator pedal towards its low-speed position, and an accelerator pedal switch having two normally separated contacts in said first electrical circuit, said pedal being urged by said yieldable means into operative engagement with said latter switch, whereby the said contacts thereof are maintained in mutual engagement when the accelerator pedal is in its said low-speed position.

9. In a fuel control device for an automobile internal combustion engine having a fuel passageway operatively connected therewith and an accelerator pedal, the combination according to claim 3, said valve-actuating means comprising a solenoid having a plunger and a conducting coil operatively disposed thereabout, said plunger being operatively connected to said valve member and being operatively movable between an operative and an inoperative position, a contact member mounted on and movable with said plunger, and solenoid contacts with which said contact member is in engagement when the plunger is in one of its said positions, said last-mentioned contacts being in said third electrical circuit, said accelerator pedal having a yieldable contact arm, spring means urging said accelerator pedal towards its low-speed position, and an accelerator pedal switch having two normally separated contacts in said first electrical circuit, said contact arm being operatively engageable with said latter switch under the action of said spring means, whereby the contacts of said switch are maintained in mutual engagement when the accelerator pedal is in its said low-speed position.

10. In a fuel control device for an internal combustion engine having a fuel passageway operatively connected therewith, the combination of a valve member operatively connected with said passageway, an electrical generator connected to said engine, whereby the speed of the engine will control the operative speed of the generator, electro-mechanical means comprising a core and two opposing conducting coils operatively disposed thereabout, the first being a magnetizing coil and the second a demagnetizing coil, an armature arm in operative relation to said core and movable between two respective limiting positions when said core is operatively magnetized and demagnetized, an electrical circuit connecting said generator to said first coil, another electrical circuit connecting said generator to said second coil, the electrical characteristics of said respective coils and their said respective electrical circuits being such that the operative core-magnetizing action of said first mentioned coil is greater than the operative demagnetizing action of said other coil, valve-actuating means operatively connected to said valve member and operatively responsive to said armature arm in one of its said positions, whereby said valve-actuating means will actuate said valve member when said arm is operatively actuated by said electro-mechanical means, said first coil and said first-mentioned electrical circuit having such electrical characteristics as to induce sufficient magnetic energy in said core for operatively attracting said arm only in response to electrical energy above a predetermined critical magnitude, said generator being operable at a range of speeds for producing electrical energy of magnitudes ranging from below to above said critical magnitude.

11. In a fuel control device for an internal combustion engine having a fuel passageway operatively connected therewith, a valve member operatively connected with said passageway, a solenoid operatively connected to said valve member, a battery circuit for said solenoid, a first generator circuit, a second generator circuit, and a relay control device operatively connected to said circuits, said relay device comprising a casing, an electro-magnetic member mounted in the casing and having a core and mounted thereover a first coil and a second opposing coil, a ground terminal on the casing electrically connected to one end of said first coil, a first binding post terminal on the casing electrically connected to the other end of the first coil and to said first generator circuit, a resistance having one terminal thereof electrically connected to one end of said second coil, a second binding post terminals on the casing electrically connected to the other terminal of the resistance and said second generator circuit, a switch mounted in the casing and having two coactive contacts one of which is movable, an armature arm positioned over said core for operative engagement therewith, a portion of said arm being engageable with said movable contact to bring it into engagement with the other contact, spring means urging said arm out of engagement with said core and said movable contact, a third binding post terminal on the casing electrically connected to one of said contacts and said battery circuit, and a fourth binding post terminal on the casing electrically connected to the other contact and said battery circuit.

12. In a fuel control device for an internal combustion engine having a fuel passageway operatively connected therewith, the combination of a valve member operatively connected with said passageway and movable between two limiting positions, electro-mechanical means operatively connected to said valve member and operatively responsive to electrical energy above a first predetermined critical magnitude for moving said valve member to one of its said limiting positions, return means operatively connected to said electro-mechanical means and responsive to electrical energy below a second critical magnitude less than said first critical magnitude for actuating said electro-mechanical means to move said valve member to the other of said limiting positions, and, an electrical generator connected to said engine, whereby the speed of the engine will conrtol the operative speed of the generator, said generator being operable at a range of speeds for producing electrical energy of magnitudes ranging from below said second critical magnitude to above said first critical magnitude, said electro-mechanical means and said return means being electrically connected to said generator.

13. In a fuel control device for an internal combustion engine having a fuel passageway operatively connected therewith, the combination of a valve member operatively connected with said passageway, an electrical generator connected to said engine, whereby the speed of the engine will control the operative speed of the generator, electro-mechanical means comprising a core and two opposing conducting coils operatively disposed thereabout, the first being a magnetizing coil and the second a demagnetizing coil, an armature arm in operative relation to said core and movable between two respective limiting positions when said core is operatively magnetized and operatively demagnetized, an electrical circuit connecting said generator to said first coil, another electrical circuit connecting said generator to said second coil, switch means in said latter circuit, actuating means for said switch means, valve-actuating means operatively connected to said valve member and operatively responsive to said armature arm in one of its said positions, whereby said valve-actuating means will actuate said valve member when said arm is operatively actuated by said electro-mechanical means, the electrical characteristics of said respective coils and their said respective circuits being such that in response to generator voltage above a predetermined critical magnitude said core will be magnetized to a degree sufficient for magnetically holding said arm, and in response to generator voltage below said critical magnitude said core will be operatively demagnetized, said electrical characteristics being also such that at the time of the operative closing of said switch means the consequent energization of said second coil will occur when the generator voltage is at a higher magnitude than said critical magnitude, said generator being operable at a range of speeds for producing voltage of magnitudes ranging from below to above said critical magnitude.

References Cited in the file of this patent

UNITED STATES PATENTS

| | | |
|---|---|---|
| 2,033,019 | Weinmann | Mar. 3, 1936 |
| 2,142,403 | McCullough | Jan. 3, 1939 |
| 2,393,579 | Weiss | Jan. 22, 1946 |
| 2,415,336 | Carlson | Feb. 4, 1947 |
| 2,662,512 | Schaffer | Dec. 15, 1953 |
| 2,741,233 | McKinley | Apr. 10, 1956 |